Patented Feb. 3, 1948

2,435,356

UNITED STATES PATENT OFFICE 2,435,356

TRISAZO UREA DYESTUFFS

Otto Kaiser, Basel, Switzerland, assignor to the firm Society of Chemical Industry in Basle, Basel, Switzerland No Drawing. Application March 24, 1943, Serial No. 480,371. In Switzerland April 2, 1942

4 Claims. (Cl. 260—173)

It has been found that the trisazo dyestuffs of the general formula

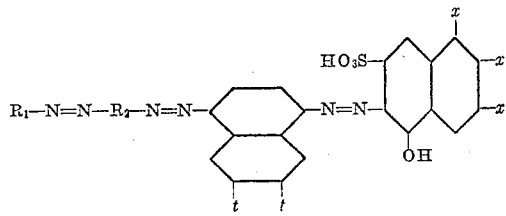

are very valuable products. In this general formula $R_1$ stands for a benzene nucleus which contains an OH-group and a carboxyl group in ortho-position to this OH-group in addition to, possibly, other substituents, $R_2$ stands for an aromatic radical of the benzene or of the naphthalene series which is derived from so-called middle components, one $t$ stands for a hydrogen atom and the other $t$ for a member of the group consisting of a hydrogen atom and a sulfonic acid group, two $x$'s stand for hydrogen atoms and one $x$ stands for an atom grouping

which atom grouping is characterized by the presence of a benzene nucleus carrying a COOH-group in ortho-position to a OH-group, and in which the —NH-group is linked to a carbonyl group or to the carbon atom of a

atom grouping, which atom grouping belongs to a heterocyclic compound of which the heterocyclic ring consists of six members which consist themselves of three to four carbon atoms and two to three nitrogen atoms, and contains the said atom grouping

at least twice and not more than three times, and in which formula the carbonyl group or the heterocyclic residue is linked to the benzene nucleus carrying the OH-group and the COOH-group by a bridge consisting of at least one nitrogen atom.

The dyestuffs explained in the foregoing formula may also be interpreted as follows:

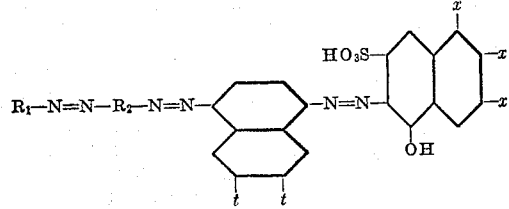

in which $R_1$ stands for a benzene nucleus which carries as substituents at least one OH-group and a carboxyl-group in ortho-position to this OH-group, $R_2$ stands for an aromatic nuclei selected from the group consisting of benzene and naphthalene nuclei, and in which nucleus the —N=N-groups stand in 1:4-position to one another in which formula one $t$ stands for a hydrogen atom and the other $t$ for a member of the group consisting of a hydrogen atom and a sulfonic acid group, in which formula further two $x$'s stand for hydrogen atoms and one $x$ stands for an atom grouping

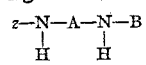

wherein B represents an atom grouping which is characterized by the presence of a benzene ring which carries as substituents at least one OH-group and a carboxyl group in ortho-position to said OH-group, $z$ stands for a member selected from a single bond and a

group wherein one $v$ stands for a hydrogen atom and the other $v$ for a

group which is linked with the

group to the naphthalene component, and wherein finally A stands for an atom grouping selected from the group consisting of the carbonyl group and a heterocyclic atom grouping whose heterocyclic ring consists of six members which consist themselves of three to four carbon atoms and two to three nitrogen atoms and contains the atom grouping

to the carbon atom of which the

groups are linked at least twice and not more than three times.

Such trisazo dyestuffs correspond for example to the general formula

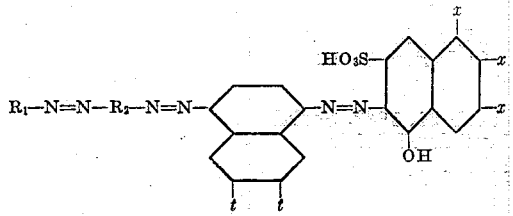

in which $R_1$ stands for a benzene nucleus which carries as substituents at least one OH-group and a carboxyl group in ortho-position to this OH-group, $R_2$ stands for an aromatic nuclei selected from the group consisting of benzene and naphthalene nuclei, and in which nucleus the —N=N- groups stand in 1:4-position to one another in which formula one $t$ stands for a hydrogen atom and the other $t$ for a member of the group consisting of a hydrogen atom and a sulfonic acid group, in which formula further two $x$'s stand for hydrogen atoms and one $x$ stands for an atom grouping

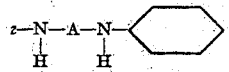

in which atom grouping the benzene nucleus carries as substituents at least one OH-group and a carboxyl group in ortho-position to said OH-group, $z$ stands for a member selected from a single bond and a

group wherein one $v$ stands for a hydrogen atom and the other $v$ for a

group which is linked with the

group to the naphthalene component, and wherein finally A stands for an atom grouping selected from the group consisting of the carbonyl group and of a heterocyclic atom grouping whose heterocyclic ring consists of six members which consist themselves of three to four carbon atoms and two to three nitrogen atoms and contains the atom grouping

to the carbon atom of which the

groups are linked at least twice and not more than three times.

All these dyestuffs are characterized by a pronounced affinity for cellulose or regenerated cellulose, for example for textiles consisting of or containing such materials, for instance mixtures of cotton and artificial fibers from regenerated cellulose or regenerated cellulose delustred by means of inorganic pigments, or mixtures of wool and such artificial fibers. The new dyestuffs dye these materials grey to blue-grey and green or olive-grey tints. The fastness to light and the wet fastness properties of the dyeings can be essentially enhanced by after-treatment with metal salts, especially copper salts. This metallization can be effected simultaneously with the dyeing.

The new trisazo dyestuffs are obtained according to the methods known for the manufacture of such products.

(A) They can be obtained for example by diazotizing disazo-dyestuffs of the general formula

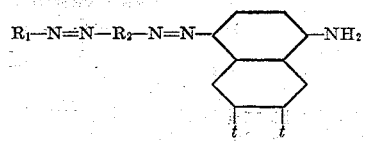

wherein one $t$ stands for a hydrogen atom and the other $t$ for a member of the group consisting of a hydrogen atom and a sulfonic acid group, $R_1$ stands for a benzene nucleus which contains an OH-group and a carboxyl group in ortho-position to this OH-group in addition to, possibly, other substituents, $R_2$ stands for an aromatic radical of the benzene or of the naphthalene series which is derived from so-called middle components, and coupling with amino-hydroxynaphthalene-sulfonic acid derivatives corresponding to the general formula

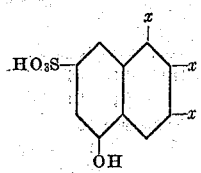

in which $x$ has the same significance as above.

Starting materials corresponding to the radical $R_1$ are for example 1-amino-4-hydroxybenzene-3-carboxylic acid, 1-amino-5-methyl-4-hydroxybenzene-3-carboxylic acid, 1-amino-4-hydroxybenzene-5-sulfo-3-carboxylic acid, 1-amino-2-hydroxybenzene-5-sulfo-3-carboxylic acid, 1-amino-2-hydroxy-5-chloro- or -5-nitrobenzene-3-carboxylic acid and the like.

Middle components corresponding to the radical $R_2$ are for example:

1 - aminonaphthalene, 1 - aminonaphthalene-7-sulfonic acid, 1-aminonaphthalene-6-sulfonic acid, 1-amino-2-methoxy- or -2-ethoxy-naphthalene- -6- or -7-sulfonic acid, 1-amino-2-ethoxynaphthalene, 1-amino-2:5-dimethoxy- or -diethoxybenzene, 1-amino-3-acetylamino-benzene, 1-amino-2-methoxy- or -2-ethoxy-5-acetylaminobenzene, 1-amino-2-ethoxy- or -2-methoxy-5-methylbenzene, 1-amino-2-methoxy-benzene, 1-amino - 3 - methoxybenzene, 1-amino-3-methylbenzene, 1-amino-2:5-dimethylbenzene, 1-aminobenzene and the like.

The starting disazo-dyestuffs of the above characterized general formula may be prepared in known manner with aid of the indicated starting materials. If the middle component does not easily couple with the diazotized salicylic acid derivatives or with the diazotized monoazo-dyestuffs, it is advantageous to use them in the form of the corresponding ω-methane-sulfonic acids; the dyestuffs thus obtained are then saponified prior to the diazotization.

Compounds of the general formula

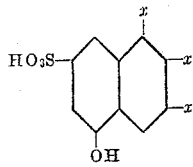

in which $x$ has the meaning indicated above include such aminonaphthalene derivatives in which $x$ and the symbol

explained in the first paragraph of the specification stand for an atom grouping

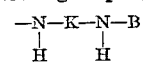

in which K represents a connecting link consisting of an atom grouping, which consists itself, besides possible other atom groupings, of at least one carbonyl group or of the radical of a heterocyclic compound containing mobile halogen atoms which has been caused to react, in which compound the heterocyclic ring consists of six members which consist themselves of three to four carbon atoms and two to three nitrogen atoms, not more than two nitrogen atoms being adjacent, and which contains the atom grouping

halogen at least twice and not more than three times.

Such compounds are obtained for example by linking amino - hydroxynaphthalene - sulfonic acids of the general formula

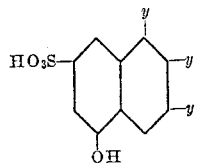

in which two $y$'s stand for a hydrogen atom each, and one $y$ for an NH₂ group, with the aid of compounds having at least two mobile halogen atoms, such as phosgene, the dichloride of terephthalic acid, or also heterocyclic compounds in which the heterocyclic ring consists of six members which consist themselves of three to four carbon atoms and two to three nitrogen atoms, nor more than two nitrogen atoms being adjacent, and which contain the atom grouping

halogen at least twice and not more than three times, with amino-hydroxybenzene-carboxylic acids, in which the carboxyl group stands in ortho-position to the OH-group and wherein any mobile halogen atoms which may still be present after linking has been effected can be exchanged, if desired by the reaction with compounds having mobile hydrogen atoms, such as ammonia, primary amines such as mono-methylamine, monoethanol-amine, aniline, 1-amino-4-hydroxybenzene-3-carboxylic acid and the like.

As heterocyclic compounds of the above characterized kind having at least two mobile halogen atoms there come into question for example phosgene, cyanuric chloride, cyanuric bromide, dichloroquinazoline, tribromopyrimidine, dichloromethyl-pyrimidine, 1:3-dichloro-5-phenyl- or -5-methyltriazine and the like.

Further representatives of this class of compounds are obtained if instead of the amino-hydroxynaphthalene-sulfonic acid of the already explained formula

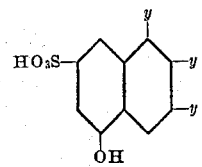

or the amino-hydroxybenzene-carboxylic acids used as starting materials for the radical

there are used such derivatives of these compounds in which the amino group is acylated by an aminoaroyl group or by an aminoaryl-carbamic acid group or substituted by a heterocyclic residue of the just characterized kind, in which further at least one mobile halogen atom has been replaced by an arylamino group which contains still a primary, aromatically bound amino group besides the amino group which has reacted with the halogen atom.

Thus there are obtained compounds such as

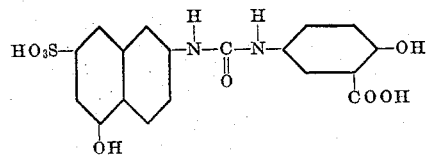

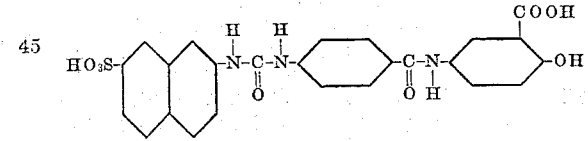

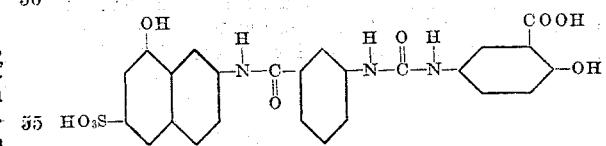

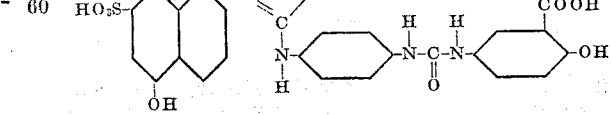

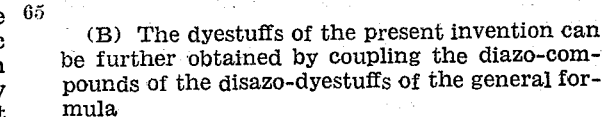

(B) The dyestuffs of the present invention can be further obtained by coupling the diazo-compounds of the disazo-dyestuffs of the general formula

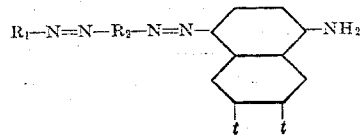

in which $R_1$, $R_2$ and the two $t$'s have the already indicated significance, with amino-hydroxynaphthalene-sulfonic acids of the already explained formula

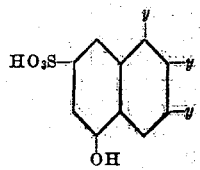

in which two $y$'s stand for hydrogen atoms and one $y$ stands for a primary amino group or for an amino group which is substituted by an acid radical which contains itself an aromatically bound primary amino group. When coupling is complete, the amino group is converted into the radical $x$ which has also been explained above, by linking the trisazo-dyestuffs thus obtained with the aid of compounds described in column 5 of this specification having at least two mobile halogen atoms with such compounds free from azochromophores and which contain on the one hand a primary amino group and on the other hand a benzene nucleus which contains an OH-group and a COOH-group in ortho-position to this OH-group.

Representatives of the compounds carrying on the one hand an amino group and on the other hand an OH-group which stands in ortho-position to a carboxyl group, may consist of aminophenols which contain a carboxyl group in ortho-position to the OH-group. Such compounds have been enumerated for example in column 4, lines 50-57 of the present specification. More complicated compounds may also be used, for example the reduced condensation products from nitrated aromatic carboxylic acid chlorides and the just named aminophenol-carboxylic acids. Condensation products may also be used which are obtained by linking the cited aminophenol-carboxylic acids with aromatic compounds which besides a primary amino group contain a second primary amino group or an atom grouping convertible into such a group, with the aid of the compounds described in column 5, lines 53-62 and column 6 lines 1-7 of the present specification containing at least two mobile halogen atoms, and after effecting the linkage converting the convertible atom grouping into an amino group. The amino groups in azo-dyestuffs of the general formula

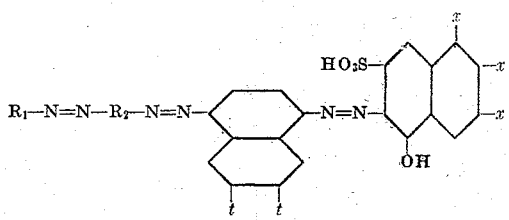

in which the two $t$'s have the already explained significance and two $y$'s stand for hydrogen atoms and one $y$ stands for an amino group, are thus converted into the already explained radical $x$

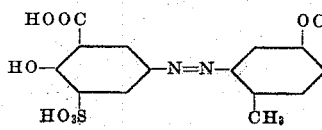

which may correspond for example to the following formulas

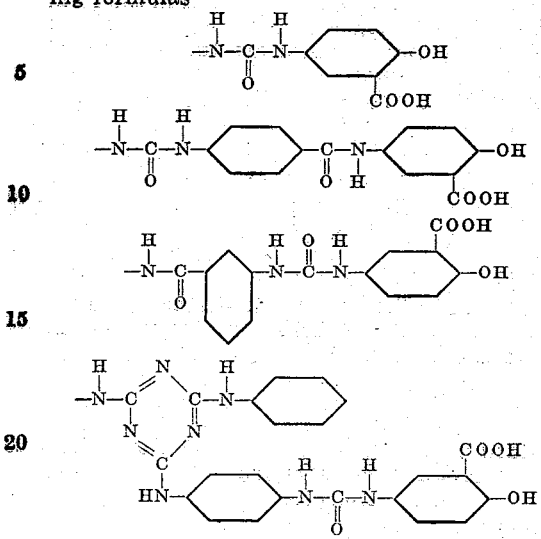

and the like (cf., in this connection the formulas in column 6 of this specification).

The following examples illustrate the invention, but are not to be regarded as limiting it in any way, the parts being by weight:

Example 1

23.3 parts of 1-amino-3-carboxy-4-hydroxybenzene-5-sulfonic acid are diazotized in usual manner in 150 parts of water and coupled at 0° C. in the presence of sodium acetate with 13.7 parts of 1-amino-3-methyl-6-methoxybenzene which have been dissolved in 10 parts of concentrated hydrochloric acid and 40 parts of water. The monoazodyestuff which separates is brought into solution with aqueous caustic soda solution, mixed with 6.9 parts of sodium nitrite in an aqueous solution of 25 per cent. strength, and the whole is allowed to run into a mixture of 200 parts of ice water and 50 parts of concentrated hydrochloric acid. When the diazotization which has been carried out at 0-5° C. is complete, the diazo compound which has separated with common salt is sucked off and coupled with 22.3 parts of 1-naphthylamine-6-sulfonic acid which as sodium salt have been dissolved in 200 parts of water. 20 parts of sodium acetate are strewn in during coupling and the product is separated after some time with common salt. It is brought into solution with some caustic soda solution, mixed with 6.9 parts of sodium nitrite in a solution of 25 per cent. strength, and this mixture is further diazotized at 15° C. with a mixture of 200 parts of ice water and 50 parts of concentrated hydrochloric acid. The diazo compound which has separated is then mixed in a solution alkaline with sodium carbonate with 41.8 parts of urea from equimolecular proportions of 2-amino-5-hydroxynaphthalene-7-sulfonic acid and 1-amino-3-carboxy-4-hydroxybenzene prepared in known manner with phosgene.

When coupling is complete, the dyestuff of the formula

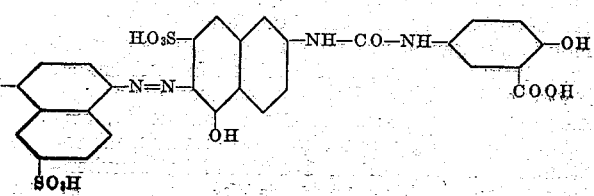

is separated and dried. It is a dark powder which dyes cotton in a feebly alkaline bath in the presence of copper sulfate in sodium tartrate reddish grey tints which are fast to washing.

In this example the 1-amino-3-carboxy-4-hydroxybenzene-5-sulfonic acid can be replaced by the 1-amino-3-carboxy-4-hydroxy-benzene-6-sulfonic acid or by the 1-amino-2-hydroxybenzene-3-carboxy-5-sulfonic acid. The 1-amino-3-methyl-6-methoxybenzene can also be replaced by the 1-amino-3-methylbenzene, the 1-amino-2:5-dimethyl-benzene, the 1-amino-2:5-dimethoxybenzene, the 1-amino-3-acetyl-aminobenzene, the 1-amino-2-methoxybenzene (in the form of its ω-methane-sulfonic acid) or by the 1-amino-2-methoxy-5-acetylamino-benzene. The 1-naphthylamine-6-sulfonic acid can be replaced by the 1-naphthylamine-7-sulfonic acid or also by the technical mixture of the 1-naphthylamine-6- and the 1-naphthylamine-7-sulfonic acid. The connecting link CO can be replaced by a triazine radical or a phenyltriazine radical or by a quinazoline radical. Finally, the derivative of the 2-amino-5-hydroxynaphthalene-7-sulfonic acid can also be replaced by a derivative of the 2-amino-8-hydroxynaphthalene-6-sulfonic acid or by a derivative of the 1-amino-5-hydroxynaphthalene-7-sulfonic acid.

Further dyestuffs are for example those of the formulas

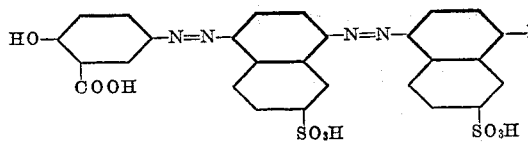
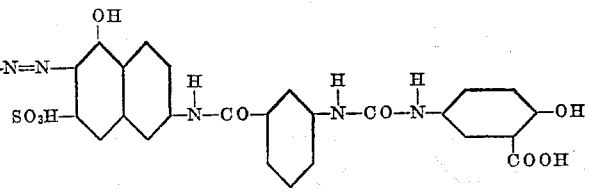

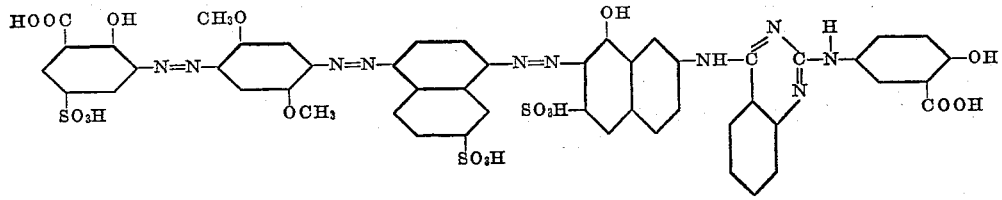
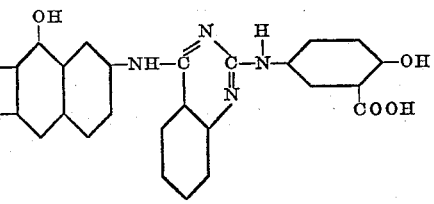

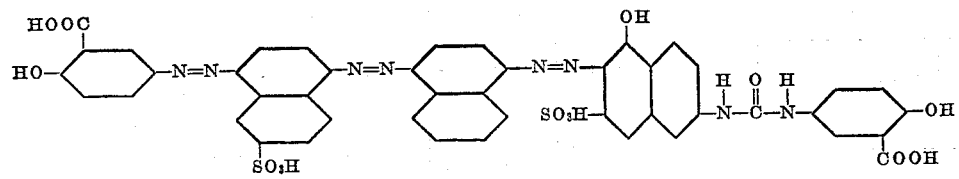
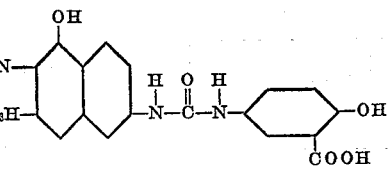

Example 2

15.3 parts of 1-amino-3-carboxy-4-hydroxybenzene are diazotized in usual manner and coupled at 0° C. in the presence of sodium acetate with 22.3 parts of 1-naphthylamine-7-sulfonic acid which as sodium salt have been dissolved in 200 parts of water. The monoazo-dyestuff which separates is brought into solution with aqueous caustic soda solution, mixed with 6.9 parts of sodium nitrite in an aqueous solution of 25 per cent. strength, and the whole is allowed to run into a mixture of 200 parts of ice water and 50 parts of concentrated hydrochloric acid. When the diazotization which has been carried out at 0-5° C. is complete, the diazo compound which has been separated with common salt is sucked off and coupled with further 22.3 parts of 1-naphthylamine-7-sulfonic acid which as sodium salt have been dissolved in 200 parts of water. 20 parts of sodium acetate are strewn in during coupling and the product is separated after some time with common salt. It is brought into solution with some caustic soda solution, mixed with 6.9 parts of sodium nitrite in a solution of 25 per cent. strength, and this mixture is further diazotized at 15° C. with a mixture of 200 parts of ice water and 50 parts of concentrated hydrochloric acid. The diazo compound which has separated is then mixed in a solution alkaline with sodium carbonate with 53.3 parts of urea from equimolecular quantities of 2-(3'-aminobenzoylamino)-5-hydroxynaphthalene-7-sulfonic acid and 1-amino-3-carboxy-4-hydroxybenzene prepared in known manner with phosgene.

When coupling is complete, the dyestuff of the formula is separated and dried. It is a dark powder which dyes cotton in a feebly alkaline bath in the presence of copper sulfate and sodium tartrate greenish blue tints which are fast to washing.

A similar dyestuff is formed when replacing the 2-(3'-aminobenzoylamino)-5-hydroxynaphthalene-7-sulfonic acid by the 2-(4'-aminobenzoylamino)-5-hydroxynaphthalene-7-sulfonic acid. The 1-naphthylamine-7-sulfonic acid can also be replaced once or twice by the 1-naphthylamine-6-sulfonic acid or by a technical mixture of the two acids. Besides this, reference is made to the explanations in the last paragraph of Example 1 which apply also here mutatis mutandis.

Example 3

15.3 parts of 1-amino-3-carboxy-4-hydroxybenzene are diazotized in usual manner and coupled at 0° in the presence of sodium acetate with 22.3 parts of 1-naphthylamine-7-sulfonic acid which as sodium salt have been dissolved in 200 parts of water. The monoazo-dyestuff which separates is brought into solution with aqueous caustic soda solution, mixed with 6.9 parts of sodium nitrite in an aqueous solution of 25 per cent. strength, and the whole is allowed to run into a mixture of 200 parts of ice water and 50 parts of concentrated hydrochloric acid. When the diazotization which has been carried out at 0-5° C. is complete, the diazo compound which has been separated with common salt is sucked off and coupled with 13.7 parts of 1-amino-3-methyl-6-methoxybenzene which have been dissolved in 10 parts of concentrated hydrochloric acid and 40 parts of water. 20 parts of sodium acetate are strewn in during coupling and the product is separated after some time with common salt. It is brought into solution with some caustic soda solution, mixed with 6.9 parts of sodium nitrite in a solution of 25 per cent. strength, and this mixture is further diazotized at 15° C. with a mixture of 200 parts of ice water and 50 parts of concentrated hydrochloric acid. The suction-filtered diazo solution is then mixed in a solution alkaline with sodium carbonate with 65 parts of urea from 1-mol. of 2-(4'-aminobenzoylamino) - 5 - hydroxynaphthalene - 7-sulfonic acid and 1 mol. of 4-(4'-aminobenzoylamino) -1 - hydroxybenzene - 2 - carboxylic acid which has been prepared in known manner.

When coupling is complete, the dyestuff of the formula

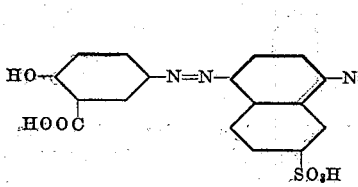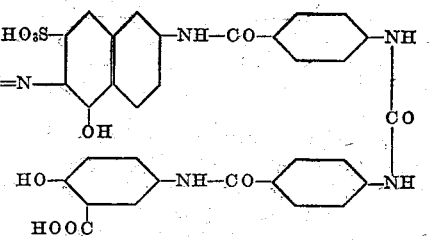

is separated and dried. It is a dark powder which dyes cotton in a feebly alkaline bath in the presence of copper sulfate and sodium tartrate grey tints which are fast to washing.

Here, too, the middle components can be replaced by those indicated in Example 1. The para-nitrobenzoyl-chloride used for the manufacture of the urea-like azo-components can be replaced by one or 2 mols. of meta-nitrobenzoyl-chloride. Furthermore, the CO-group of the urea radical can be replaced by a triazine radical, by a phenyl-triazine radical or by a quinazoline radical. Besides this, reference is made to the explanations in the last paragraph of each of Examples 1 and 2 and to those in the introduction from which numerous modifications in the manufacture of the dyestuff of this example can be gathered.

Example 4

100 parts of cotton are introduced at 40–50° C. into a dye-bath containing 3000 parts of water, 1.5 parts of the dyestuff prepared according to Example 1 and 2 parts of anhydrous sodium acetate. The bath is heated to 90–95° C. within ½ hour, 30 parts of crystallized sodium sulfate are added and dyeing is continued for ¾ hour at this temperature. A solution of 2 parts of crystallized copper sulfate and 2.5 parts of water of tartaric acid in 100 parts which has been neutralized with caustic soda solution is added to the dye-bath and the cotton is treated for ½ hour at 95° C. The cotton is rinsed as usual and dried. It is dyed fast reddish grey tints.

The dyestuffs of the present invention can be used also for dyeing mixed fabrics, for example fabrics consisting of wool and viscose cellulose wool. In such cases it is preferable to dye in a neutral bath in the presence of sodium and potassium chromate.

Further examples of dyestuffs made in accordance with the invention are given in the following table, in which the dyestuffs are of the formula $$R_1—N=N—R_2—N=N—R_3—N=N—Y—X—Z$$

and the components of each dyestuff are listed in the columns headed $R_1$, $R_2$, $R_3$, Y, X and Z:

Table

| | $R_1$ | $R_2$ | $R_3$ | Y | X | Z |
|---|---|---|---|---|---|---|
| 1 | 1-amino-4-hydroxybenzene-5-sulfo-3-carboxylic acid. | 1-amino-2-methoxy-5-methylbenzene. | 1-aminonaphthalene-7-sulfonic acid. | 2-amino-8-hydroxynaphthalene-6-sulfonic acid. | $-\underset{\underset{H}{\mid}}{\overset{\overset{O}{\parallel}}{C}}-N-\bigcirc-CO-$ | 1-amino-4-hydroxybenzene-3-carboxylic acid. |
| 2 | ...do... | ...do... | ...do... | 2-amino-5-hydroxynaphthalene-7-sulfonic acid. | ...do... | Do. |
| 3 | 1-amino-4-hydroxybenzene-3-carboxylic acid. | 1-aminonaphthalene. | ...do... | ...do... | ...do... | Do. |
| 4 | ...do... | 1-aminonaphthalene-7-sulfonic acid. | ...do... | ...do... | C=O | Do. |
| 5 | ...do... | 1-aminonaphthalene-6-sulfonic acid. | 1-aminonaphthalene. | 2-amino-8-hydroxynaphthalene-6-sulfonic acid. | $-\underset{\underset{H}{\mid}}{\overset{\overset{O}{\parallel}}{C}}-N-\bigcirc-CO-$ | Do. |
| 6 | ...do... | 1-aminonaphthalene-7-sulfonic acid. | ...do... | ...do... | ...do... | Do. |
| 7 | ...do... | ...do... | 1-aminonaphthalene-7-sulfonic acid. | 2-(4'-aminophenyl-amino)-8-hydroxynaphthalene-6-sulfonic acid. | ...do... | Do. |
| 8 | ...do... | 1-aminonaphthalene. | ...do... | 2-amino-5-hydroxynaphthalene-7-sulfonic acid. | triazine ring with $HNC_6H_5$ | 1-hydroxy-2-amino-4-nitrobenzene-6-carboxylic acid. |

The dyestuffs 1, 4 and 8 of the foregoing table correspond to the following formulas:

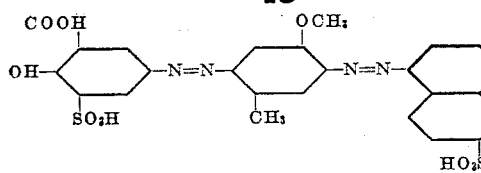
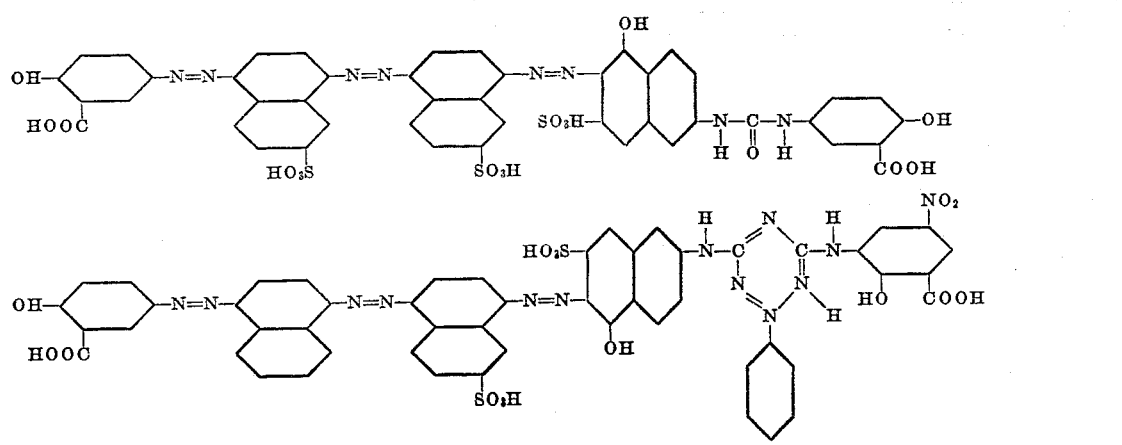
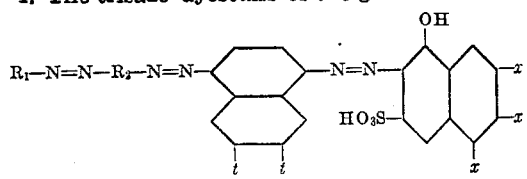
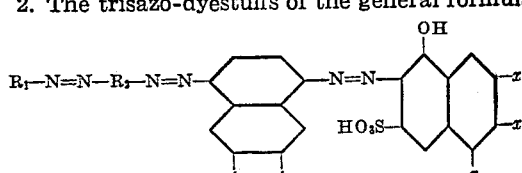

What I claim is:
1. The trisazo-dyestuffs of the general formula

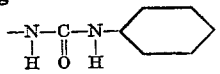

wherein R₁ stands for a benzene nucleus which contains as substituents at least one OH-group and a carboxyl group in ortho-position to this OH-group, R₂ stands for an aromatic nucleus selected from the group consisting of benzene and naphthalene nuclei and wherein the —N=N— groups stand in 1:4-position to one another, in which formula one $t$ stands for a hydrogen atom and the other $t$ for a member of the group consisting of a hydrogen atom and a sulfonic acid group, wherein further two $x$'s stand for hydrogen atoms and one $x$ stands for an unsulfonated atom grouping in which the benzene nucleus carries as substituents at least one OH-group and a carboxyl group in ortho-position to said OH-group, which products dye the cellulose fibers grey to blue-grey and green-grey tints, the wet fastness properties of which can be improved by after-treatment with compounds yielding copper.

2. The trisazo-dyestuffs of the general formula wherein R₁ stands for a benzene nucleus which contains as substituents at least one OH-group and a carboxyl group in ortho-position to this OH-group, R₂ stands for an aromatic nucleus selected from the group consisting of benzene and naphthalene nuclei and wherein the —N=N— groups stand in 1:4-position to one another, in which formula one $t$ stands for a hydrogen atom and the other $t$ for a member of the group consisting of a hydrogen atom and a sulfonic acid group, wherein further two $x$'s stand for hydrogen atoms and one $x$ stands for an unsulfonated atom grouping

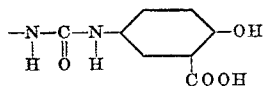

which products dye the cellulose fibers grey to blue-grey and green-grey tints, the wet fastness properties of which can be improved by after-treatment with compounds yielding copper.

3. The trisazo-dyestuffs of the general formula

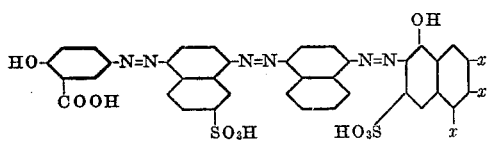

wherein two $x$'s stand for hydrogen atoms and one $x$ stands for the atom grouping

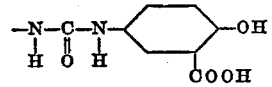

4. The trisazo-dyestuff of the formula

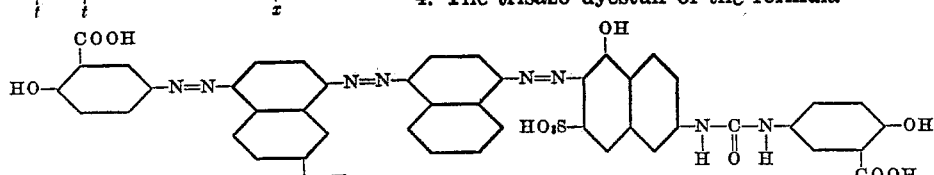

OTTO KAISER.

(References on following page)

REFERENCES CITED

The following references are of record in the file of this patent:

UNITED STATES PATENTS

| Number | Name | Date |
|---|---|---|
| 2,084,731 | Gyr et al. | June 22, 1937 |
| 2,268,919 | Anderau | Jan. 6, 1942 |

FOREIGN PATENTS

| Number | Country | Date |
|---|---|---|
| 548,679 | Germany | July 11, 1929 |
| 632,752 | Germany | Aug. 9, 1934 |
| 491,019 | Great Britain | Aug. 24, 1938 |
| 658,763 | France | Jan. 28, 1929 |